(12) United States Patent
Diekevers et al.

(10) Patent No.: US 8,540,325 B2
(45) Date of Patent: Sep. 24, 2013

(54) MACHINE AND TRACK ASSEMBLY FOR USE THEREWITH

(75) Inventors: Mark Diekevers, Metamora, IL (US); Donovan Clarke, Hanna City, IL (US); Kevin Steiner, Tremont, IL (US); Victor M. Penrod, Dunlap, IL (US); Roger L. Recker, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/443,290

(22) Filed: Apr. 10, 2012

(65) Prior Publication Data
US 2012/0193976 A1 Aug. 2, 2012

Related U.S. Application Data

(63) Continuation of application No. 12/888,542, filed on Sep. 23, 2010, now Pat. No. 8,172,342, which is a continuation of application No. 11/975,206, filed on Oct. 18, 2007, now Pat. No. 8,100,483.

(51) Int. Cl.
*B62D 55/08* (2006.01)

(52) U.S. Cl.
USPC ............ 305/198; 305/201; 305/104; 305/106

(58) Field of Classification Search
USPC ................. 305/102, 103, 104, 105, 106, 194, 305/195, 196, 197, 198, 200, 201
See application file for complete search history.

(56) References Cited

U.S. PATENT DOCUMENTS

| | | | |
|---|---|---|---|
| 3,050,346 A | 8/1962 | Simpson et al. | |
| 3,336,459 A * | 8/1967 | Seulen et al. | 219/642 |
| 3,603,650 A | 9/1971 | Miller | |
| 3,606,497 A | 9/1971 | Gilles | |
| 3,795,431 A * | 3/1974 | Boggs et al. | 305/198 |
| 3,880,478 A | 4/1975 | Baylor | |
| 3,899,219 A | 8/1975 | Boggs | |
| 3,915,511 A | 10/1975 | Clasper et al. | |
| 3,955,855 A * | 5/1976 | Massieon et al. | 305/192 |
| 3,997,217 A | 12/1976 | Bandet et al. | |
| 4,093,318 A | 6/1978 | Edwards | |
| 4,175,796 A | 11/1979 | Boggs et al. | |
| 4,572,587 A | 2/1986 | Komp et al. | |

(Continued)

FOREIGN PATENT DOCUMENTS

| | | |
|---|---|---|
| EP | 0159934 | 10/1985 |
| FR | 2550750 | 2/1985 |

(Continued)

OTHER PUBLICATIONS

"Caterpillar Custom Track Service Handbook", 13th edition, 4 pages, 1993.

*Primary Examiner* — Kip T Kotter
(74) *Attorney, Agent, or Firm* — Liell & McNeil (57) ABSTRACT

A track assembly for a machine includes a track having inner track seals, a rotatable track engaging element such as an idler or drive sprocket and a contact interface for protecting the seals during guiding the track about the rotatable element. The contact interface may include sacrificial wear material on the rotatable element and sacrificial wear material on corresponding track links. The contact interface may have a configuration based on a location of the seals, and is adapted to inhibit wear of the track links in regions adjacent the seals. In another aspect, the contact interface is a guide interface.

19 Claims, 10 Drawing Sheets

(56) References Cited

U.S. PATENT DOCUMENTS

| | | | |
|---|---|---|---|
| 4,607,892 A | 8/1986 | Payne et al. | |
| 4,818,041 A | 4/1989 | Oertley | |
| 4,819,999 A | 4/1989 | Livesay et al. | |
| 5,139,317 A * | 8/1992 | Larson et al. | 305/137 |
| 5,183,318 A * | 2/1993 | Taft et al. | 305/185 |
| 5,210,948 A | 5/1993 | Seksaria et al. | |
| 5,769,512 A | 6/1998 | Kautsch | |
| 5,829,849 A | 11/1998 | Lawson | |
| 5,829,850 A | 11/1998 | Ketting et al. | |
| 5,899,541 A | 5/1999 | Ying et al. | |
| 6,074,023 A | 6/2000 | Satou et al. | |
| 6,123,399 A | 9/2000 | Snyder | |
| 6,250,726 B1 | 6/2001 | Burdick et al. | |
| 6,371,579 B1 | 4/2002 | Phely | |
| 6,414,258 B1 * | 7/2002 | Amano | 219/76.14 |
| 6,536,853 B2 | 3/2003 | Egle et al. | |
| 6,631,961 B1 | 10/2003 | Bedford et al. | |
| 6,883,876 B2 * | 4/2005 | Yamamoto et al. | 305/115 |
| 7,040,080 B2 * | 5/2006 | Okawa et al. | 59/35.1 |
| 7,198,337 B2 | 4/2007 | Deckler et al. | |
| 7,338,138 B2 * | 3/2008 | Sho et al. | 305/201 |
| 7,347,513 B2 * | 3/2008 | Johannsen et al. | 305/203 |
| 8,025,346 B2 * | 9/2011 | Livesay | 305/106 |
| 2004/0012260 A1 | 1/2004 | Yamamoto et al. | |

FOREIGN PATENT DOCUMENTS

| | | |
|---|---|---|
| FR | 2324497 | 4/2007 |
| JP | 06156331 | 6/1994 |
| WO | 9413525 | 6/1994 |
| WO | 2006032107 | 3/2006 |

* cited by examiner

MACHINE AND TRACK ASSEMBLY FOR USE THEREWITH

CROSS-REFERENCE TO RELATED APPLICATION

This patent application is a continuation of U.S. patent application Ser. No. 12/888,542, now U.S. Pat. No. 8,172,342 B2, filed Sep. 23, 2010, which is a continuation of U.S. patent application Ser. 11/975,206, filed Oct. 18, 2007, now U.S. Pat. No. 8,100,483.

TECHNICAL FIELD

The present disclosure relates generally to machine track, and relates more particularly to a machine and associated track assembly having a unique interface design between track assembly components to protect inboard track seals from damage.

BACKGROUND

A wide variety of machines utilize tracks, commonly as ground engaging propulsion elements, but also for other purposes such as torque transmission and conveying. It is common for such tracks to include a plurality of rotatable track engaging elements, with the track forming an endless chain that is moved about the rotating elements during operation. The demands placed upon such machines and their associated track assemblies can be quite substantial, and machine tracks are often relatively robust to provide a long operating life despite significant mechanical stresses, strain and wear experienced during operation.

One conventional track system known from track-type tractors and the like utilizes one or more rotatable idlers which engage the tracks, typically working in conjunction with a drive sprocket. The idlers passively rotate to guide the associated track about a desired path. It is common in conventional track systems for the rotatable idler to roll against "rails" located on links of the track chains. More recently, designs have been implemented in certain machines where the rotatable idler and track are configured such that the idler contacts the track between adjacent parallel track chain assemblies, rather than riding on the rails.

One such design is known from U.S. Pat. No. 5,829,849 to Lawson. In the Lawson strategy, an idler contacts roller bushings located between track chain assemblies to support and guide the track as it rotates to propel the machine. Tapered side portions of the idler provide lateral guiding of the track chain assemblies. Lawson overcomes certain design and operating issues associated with conventional systems where the idler rides on rails. While Lawson provides a successful strategy, there is always room for improvement, particularly with regard to the wear characteristics of the system.

The present disclosure is directed to one or more of the problems or shortcomings set forth above.

SUMMARY

In one aspect, a track assembly for a machine includes a track having a first chain assembly, a second chain assembly coupled with the first chain assembly via a track pin, and a first and second seal located within a first and second bore, respectively, of track links of the first and second chain assemblies. The track assembly further includes a rotatable track engaging element configured to guide the track at least in part by contacting the track between the chain assemblies, and a contact interface between the rotatable track engaging element and the track. The contact interface includes means, located on at least one of the track and the rotatable track engaging element, for inhibiting track link wear in regions adjacent the seals during contacting the track with the rotatable track engaging element.

In another aspect, a machine includes a frame, and at least one track coupled with the frame which includes a first chain assembly and a second chain assembly, the chain assemblies each including a plurality of track links and being coupled together via a plurality of track pins. A plurality of seals are positioned within bores in the track links, and the machine further includes a rotatable track engaging element having an outer diameter contacting the track between the first chain assembly and the second chain assembly. The machine further includes a contact interface between the rotatable track engaging element and the track which includes a contact element on at least one of the track and the rotatable track engaging element which is configured to inhibit track link wear in regions adjacent to the seals during contacting the track with the rotatable track engaging element.

In still another aspect, a method of protecting seals of a machine track during operating the machine track includes the steps of moving a machine track having first and second parallel chain assemblies of track links about a rotatable track engaging element, and guiding the machine track relative to the track engaging element at least in part by contacting the track engaging element with the track between the first and second chain assemblies. The method further includes a step of, during guiding the machine track, protecting inner track seals disposed within the track links at least in part by inhibiting contact between the rotatable track engaging element and regions of the track links adjacent the inner track seals.

DETAILED DESCRIPTION

Figure 1:
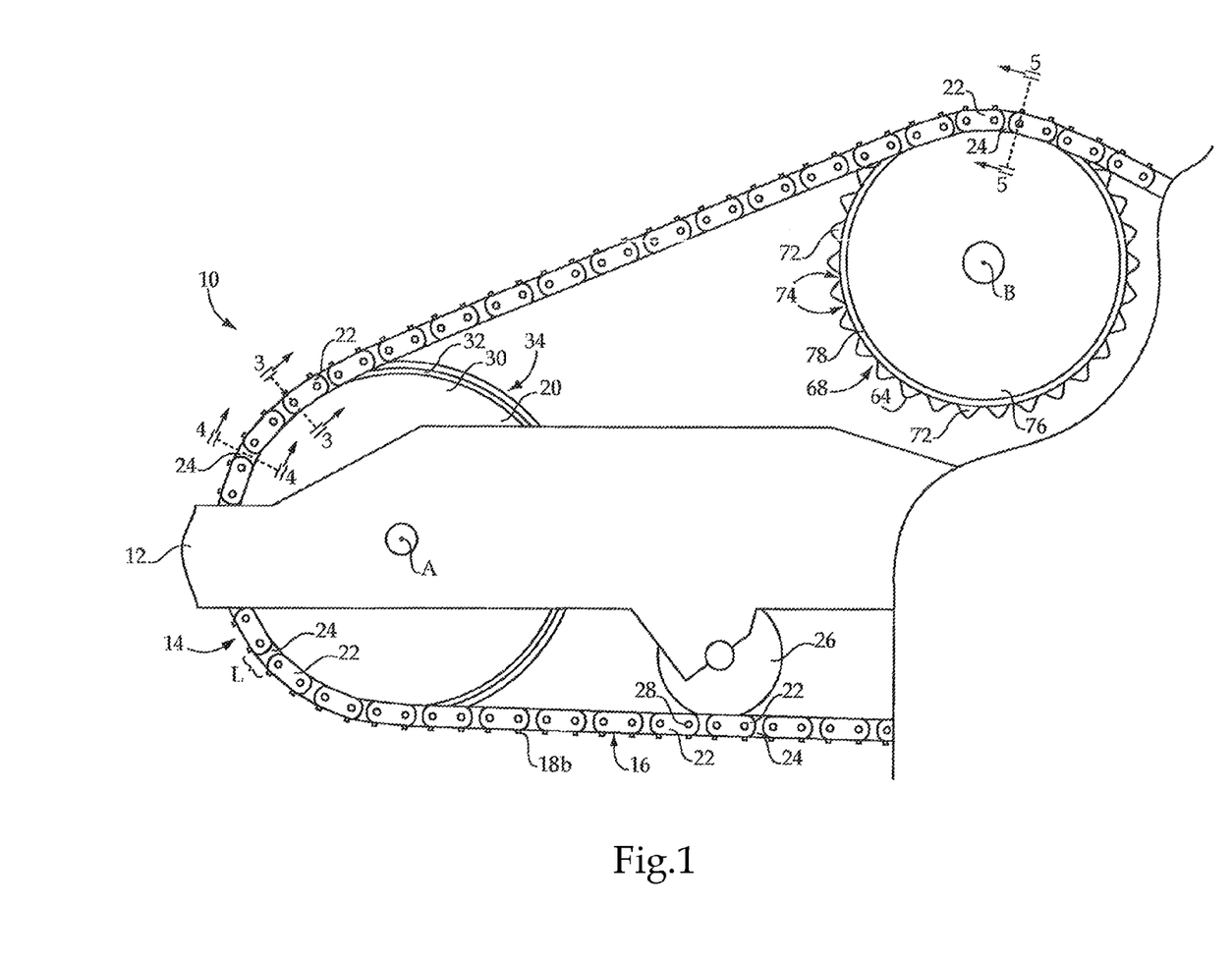
FIG. 1 is a side diagrammatic view of a portion of a machine according to one embodiment.

Referring to FIG. 1, there is shown a portion of a machine 10 according to the present disclosure. Machine 10 is shown in the context of a track-type machine having a first ground engaging track 16, mounted at a first side of a frame 12, and also including a second ground engaging track identical to track 16 and positioned at a second side of frame 12 but not visible in FIG. 1. Track 16 extends about a plurality of rotatable track engaging elements, including an idler 20 having an axis of rotation A, a drive sprocket 68 having an axis of rotation B and a plurality of track rollers, one of which is shown and identified via reference numeral 26. Machine 10 may also include other rotatable track engaging elements coupled with each of its one or more tracks such as an additional idler. While only a single track is shown in FIG. 1, the present description of track 16 and the track assembly 14 of which it is a part should be understood to refer also to a second track and associated track assembly of machine 10. While machine 10 may be a track-type machine such as a track loader, excavator, tractor or another mobile machine, the present disclosure is not thereby limited. In other embodiments, track assembly 14 might comprise a portion of a machine such as a conveyor. In all embodiments contemplated herein, track assembly 14 will be configured such that certain types of wear, in particular wear affecting track seals as described hereinbelow, will be reduced or eliminated as compared with conventional designs.

Track 16 will typically comprise two parallel track chain assemblies, one of which is shown in FIG. 1 and identified with reference numeral 18b, extending in parallel and coupled together via a plurality of track pins 28. In the illustrated embodiment, track chain assembly 18b consists of a plurality of straight outboard track links 22 alternating with a plurality of straight inboard track links 24, although other track configurations such as those having S-shaped links or multi-piece link assemblies are contemplated herein.

Figure 2:
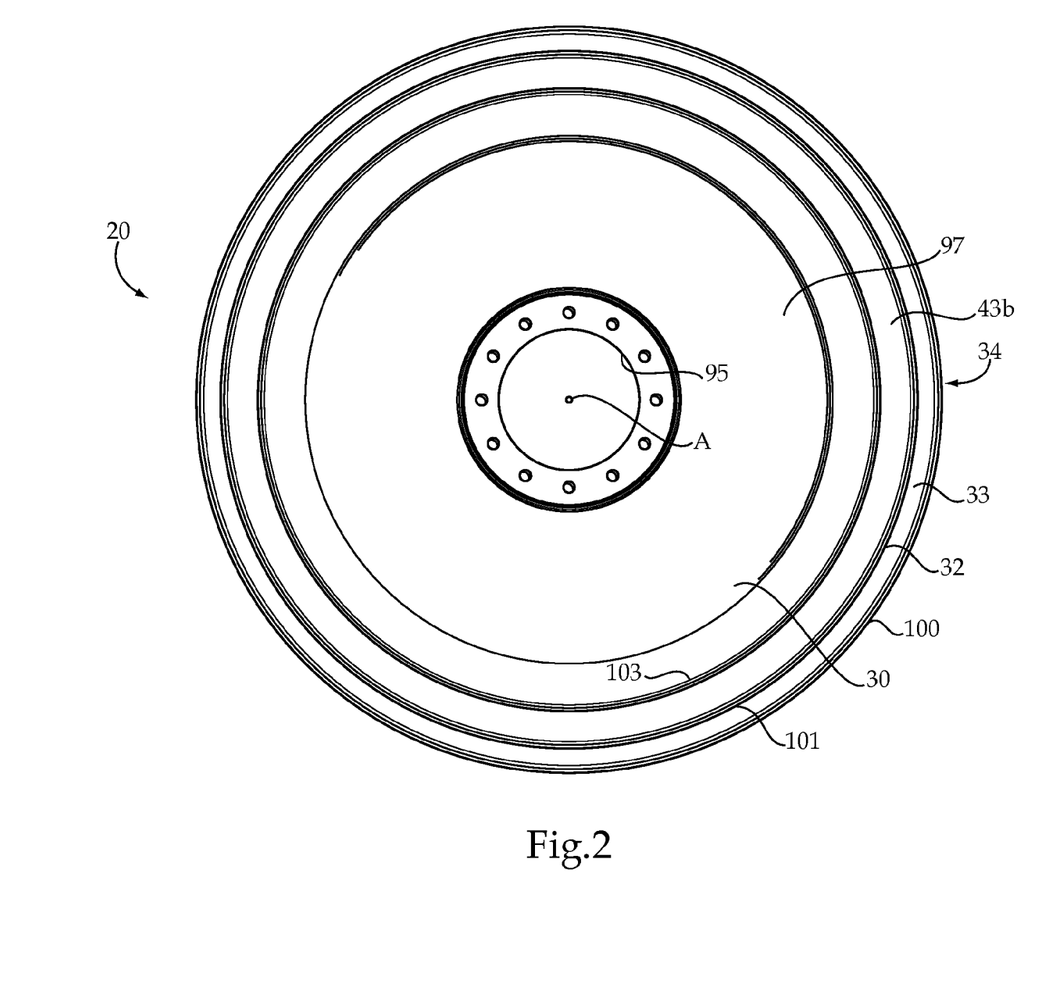
FIG. 2 is a side elevational view of an idler suitable for use in the machine of FIG. 1.

During moving track 16 about idler 20, inboard links 24 may intermittently or continuously contact idler 20, guiding track 16 thereabout. Each inboard link 24 may have a contact length L with idler 20, the significance of which will be apparent from the following description. Links 24 will also tend to contact sprocket 68 during moving track 16 thereabout, and the present description emphasizing idler 20 should be understood to be similarly applicable to an interaction between sprocket 68 and track 16, except as otherwise indicated. Referring also to FIG. 2, there is shown a side view of idler 20 showing axis of rotation A, an outer diameter 34 or outer diameter surface, which is positioned at a constant radial distance from axis A, and an inner diameter 95 or inner diameter surface. In the embodiment shown, outer diameter 34 is configured to contact track 16 between its respective chain assemblies, in particular contacting track pins 28, or rotating bushings positioned on track pins 28, as further described herein. In other embodiments, a different engagement strategy between track 16 and idler 20 might be used, for example, a sprocketed idler could be used. Idler 20 further includes a step 32 spaced radially inwardly of outer diameter 34 and separated from outer diameter 34 via a transition surface 33 which is an outboard surface. Transition surface 33 extends a first radial distance from a seal protecting wear surface 43b to outer diameter 34. An inboard surface 97 extends a second, greater radial distance from seal protecting wear surface 43b to inner diameter 95. In connection with idler 20, the terms "inboard" and "outboard" mean, respectively, toward inner diameter 95 and away from outer diameter 34, and toward outer diameter 34 and away from inner diameter 95. Step 32 extends/protrudes axially from an axial side 30 of idler 20, axial side 30 extending in a radial direction from inner diameter 95 to outer diameter 34. Step 32 assists in mitigating wear in track assembly 14 during operation, as further described herein. It may further be noted from FIG. 2 that step 32 includes concentric radially inward and radially outward step edges 103 and 101, respectively, which each define a circle centered on axis A, and that transition surface 33 adjoins outer diameter 34 at a corner 100. An opposite axial side of idler 20 is not visible in FIG. 2, but will typically be substantially identical to axial side 30.

Figure 3:
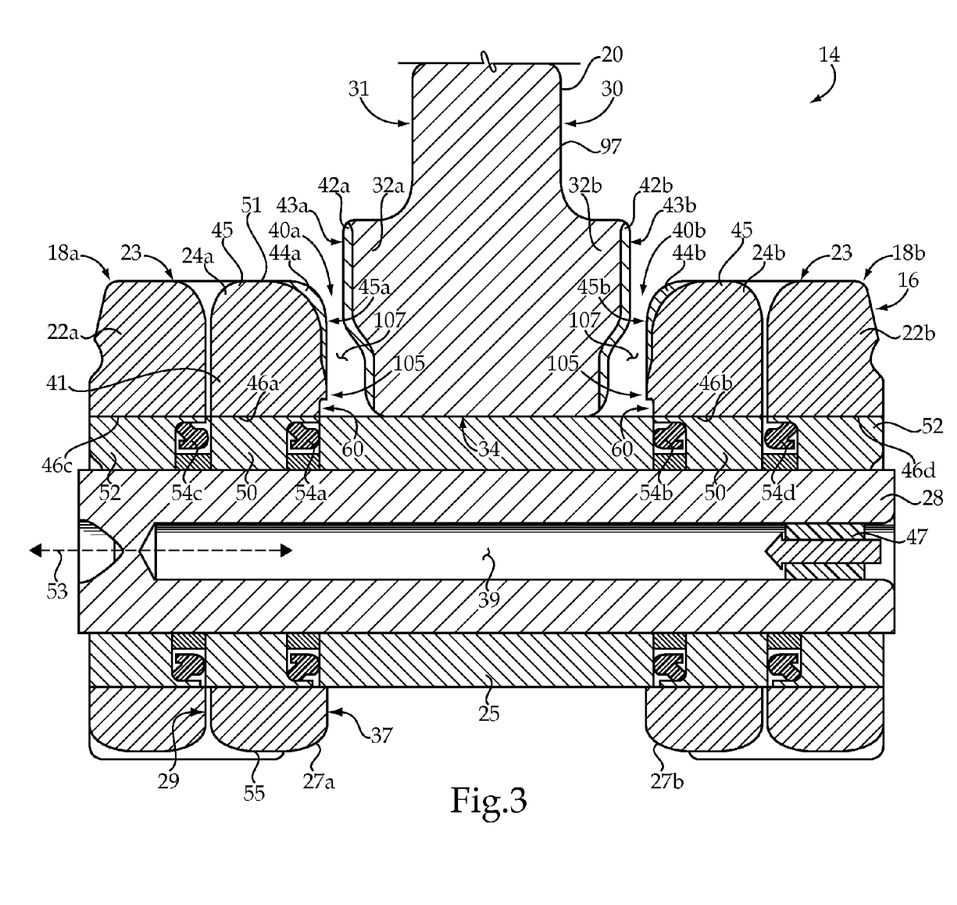
FIG. 3 is a sectioned view taken along line 3-3 of FIG. 1.

Referring now to FIG. 3, there is shown a sectioned view taken along line 3-3 of FIG. 1. As illustrated in FIG. 3, outer diameter 34 of idler 20 contacts a rotating bushing 25 positioned about pin 28. In the illustrated embodiment, pin 28 comprises a cartridge pin having a fluid cavity 39 sealed via a plug 47. Pin 28 may further include inboard collars 50 positioned on opposite sides of rotating bushing 25, and outboard collars 52 positioned outboard of each inboard collar 50, and coupled with pin 28 via any suitable means such as snap rings or the like. In other embodiments, a pin configuration or a pin assembly different from that illustrated in FIG. 3 might be used, such as a pin having an integral bushing, or a pin assembly other than a cartridge pin. Track chain assembly 18b, including an inboard link 24b and an outboard link 22b is positioned on pin 28, as is another track chain assembly 18a, also including an inboard link 24a and an outboard link 22a. Each of inboard links 24a and 24b includes a link body 27a and 27b having formed therein a bore 46a and 46b, respectively, which is typically press fit with inboard collars 50. Bore 46a of link 24a has a longitudinal axis 53 and extends between an outboard side 29 and an inboard side 37 of link body 27a, and bore 46b is similarly configured. A first end 41 of link body 27a is shown in the section view of FIG. 3, and it will be understood that link body 27a has an opposite second end, and a second bore formed therein adjacent the second end and configured to receive a second cartridge pin, as shown in FIG. 1. Longitudinal axes of the two bores define a plane, an upper link surface 51 may be positioned on a first side of the plane, and a lower link surface 55 may be positioned on a second side of the plane. A first inner track seal 54a and a second inner track seal 54b are positioned within collars 50, and thus positioned within bores 46a and 46b, respectively. Exposed seal regions 105 of links 24a and 24b face a track guiding space 107. Lubricating fluid from cavity 39 may be distributed to various of the components of track 16, and fluidly sealed from escaping via seals 54a and 54b, and such other seals 54c and 54d as may be used in conjunction with outboard collars 52 positioned within bores 46c and 46d in outboard links 22a and 22b, respectively. Each of track chain assemblies 18a and 18b may further include a rail 23 upon which other rotatable track engaging elements such as track roller 26 ride during operation.

It has been discovered that in certain conventional track assembly designs, rotatable components such as idlers and drive sprockets can have a tendency to wear away material from inboard track links, eventually exposing and damaging inboard track seals and causing leaks of lubricating fluid, as well as potentially damaging the track. This phenomenon tends to result at least in part from the shape of the track assembly components in regions where they have a tendency to contact one another. The present disclosure provides unique strategies for inhibiting this type of wear, and in particular includes a first contact interface 40a and a second contact interface 40b, which inhibit track link wear in regions of the track links adjacent seals 54a and 54b.

In one embodiment, seals 54a and 54b may be protected from wear-related damage at least in part by recessing seals 54a and 54b via recesses 60 of contact interfaces 40a and 40b. Recesses 60 extend axially within each link between the corresponding bore 46a and 46b and the inboard side of the corresponding link body. It may be noted from FIG. 3 that ends of roller bushing 25 extend into recesses 60 in links 24a and 24b and that recesses 60 have an axial recess length less than an axial length of the corresponding bore 46a and 46b.

The illustrated configuration can assist in inhibiting wear of regions of track links 24a and 24b adjacent seals 54a and 54b, respectively, by positioning seals 54a and 54b relatively further from idler 20. It should be appreciated that over the course of many hours of operation, components such as bushing 25 can wear away, such that idler 20 can actually migrate closer to seals 54a and 54b than that which is shown in FIG. 3. Recessing seals 54a and 54b can prevent or delay a time at which idler 20 wears material of links 24a and 24b and begins to impinge on seals 54a and 54b. Moreover, in some embodiments using recesses 60 to protect seals 54a and 54b may be the sole means for inhibiting track link wear in regions adjacent thereto, whereas in other embodiments recesses 60 might be used in conjunction with other means for inhibiting track link wear, or might not be used at all.

In certain embodiments, with or without using recesses 60, contact interfaces 40a and 40b may be understood as "wear" interfaces which direct wear between element 20 and chain assemblies 18a and 18b predominantly to areas of links 24a, 24b other than regions adjacent track seals 54a and 54b. For example, regions of track links 24a and 24b where recesses 60 are disposed in the FIG. 3 version may be understood as "adjacent to" seals 54a and 54b as the term "adjacent to" is intended to be understood herein. In other embodiments, described hereinbelow, contact interfaces of a track assembly may comprise guide interfaces, which, rather than directing wear, inhibit or limit certain types of contact between the respective components in the first place. By designing track assembly 14 in the manner described herein, wear on inboard track links 24a and 24b in regions adjacent seals 54a and 54b, respectively, can be reduced or eliminated as compared with conventional designs. In one embodiment, each contact interface 40a and 40b may include sacrificial wear material 42a and 42b, respectively, located on idler 20, as well as sacrificial wear material 44a and 44b located on inboard track links 24a and 24b, respectively. In other embodiments, sacrificial wear material might be located on only one of track 16 and element 20. As mentioned above, idler 20 may include a step 32b on a first axial side 30, and another step 32a on an opposite axial side 31, comprising portions of contact interfaces 40a and 40b. Each of steps 32a and 32b may protrude in axial directions relative to sides 31 and 30, respectively, and be spaced radially inwardly of outer diameter 34.

In one embodiment, each of contact interfaces 40a and 40b may comprise a first planar face 43a and a second planar face 43b located on steps 32a and 32b, respectively, each of which comprises a seal protecting wear surface also identified via reference numerals 43a and 43b, and including wear material 42a and 42b. Contact interfaces 40a and 40b may also include a third planar face 45a and a fourth planar face 45b located on track links 24a and 24b and including sacrificial wear material 44a and 44b, respectively. Faces 45a and 45b are positioned radially outward of the seal region in the corresponding link, and are radially outward and axially inboard of the corresponding bore, as shown in FIG. 3. Faces 45a and 45b adjoin an upper link surface of the corresponding link body as shown in FIG. 3. The upper link surface of link 24a is shown with reference numeral 51 in FIG. 3. It may also be noted that upper link surface 51 is formed in part by wear material 44a. Wear material 44a extends between face 45a and upper surface 51. Planar faces 43a, 43b, 45a and 45b may be oriented perpendicular axis A of idler 20 such that a contact length L between links 24a and 24b and idler 20 comprises a planar interface. The respective planar faces of the wear interfaces may face toward one another, in opposed directions, at all locations where idler 20 and links 24a and 24b may come into contact during operation, and may be parallel. This configuration can eliminate or reduce contact between edges or corners of idler 20 and portions of links 24a and 24b, as may occur where an idler having tapered axial surfaces is used. In other embodiments, certain of which are described herein, non-planar faces of wear material may be used.

In one embodiment, wear material 42a and 42b and wear material 44a and 44b may consist of hardened forged or cast material of idler 20 and inboard track links 24a and 24b, respectively. Wear material 42a, 42b, 44a and 44b may consist of the forged material of the respective components which is hardened by heat treating. In other embodiments, induction hardening, coatings or some other hardening strategy might be used. In FIG. 3, reference numeral 45 identifies forged material of inboard track links 24a and 24b. It will often, though not necessarily, be desirable to avoid hardening material of inboard track links 24a and 24b in regions where bores 46a and 46b are located, to avoid interfering with press fits with inboard inserts 50. To this end, unhardened material 45 of each link 24a and 24b may define bores 46a and 46b.

Figure 5:
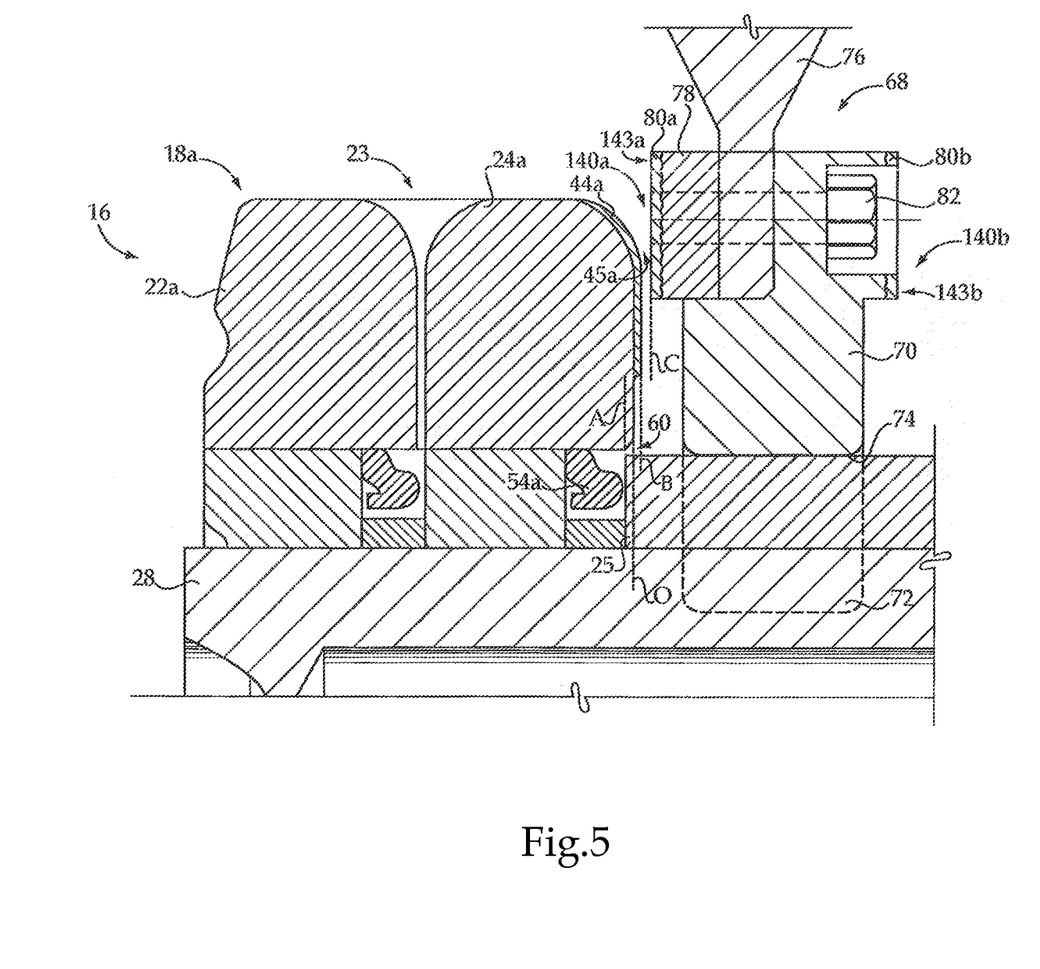
FIG. 5 is a partial sectioned view taken along line 5-5 of FIG. 1.

Turning now to FIG. 5, there is shown a partial sectioned view taken along line 5-5 of FIG. 1. As mentioned above, drive sprocket 68 may have a configuration having certain similarities with that of idler 20 to address similar wear concerns with respect to track 16. Sprocket 68 may include a plurality of outer track contacting segments 70, one of which is shown, each including a plurality of teeth 72 alternating with a plurality of pockets 74. It should be appreciated that in the FIG. 5 illustration, tooth 72 is positioned forwardly of the section plane and is therefore shown in phantom. It may also be noted from FIG. 5 that pocket 74 engages with rotating bushing 25 between the respective track chain assemblies.

A first contact interface 140a and a second contact interface 140b may be positioned on opposite axial sides of sprocket 68, and each may include wear material 80a and 80b located on sprocket 68 and wear material 44a and 44b located on inboard track links 24a and 24b. Interfaces 140a and 140b may each have a configuration based at least in part on a location of seals 54a and 54b within their corresponding track links, similar to wear interfaces 40a and 40b associated with idler 20. In other words, by providing a particular shape for the interfacing components, based on a location of the seals to be protected, wear can predominantly occur in regions not adjacent to the subject seals. For instance, in the case of sprocket 68 and idler 20, they are each configured via wear interfaces having wear material of an appropriate shape and location such that material is worn away from links 24a and 24b predominantly in regions relatively closer to rails 23, avoiding wear relatively closer to seals 54a and 54b.

"Guide" interfaces, as further described herein, may also be used in connection with sprocket 68, rather than the illustrated wear features. In one embodiment, sprocket 68 may include a hub portion 76 having track contacting segment 70 coupled therewith via a plurality of bolts 82. In other embodiments, rather than plural track contacting segments, sprocket 68 might consist of a single cast or forged piece, or one track contacting portion coupled with a separate hub portion. A nut strip 78 or the like may be provided which receives a threaded end of each of bolts 82. In FIG. 5, nut strip 78 is shown diagrammatically as a single piece, but may include a plurality of segments corresponding to a plurality of track contacting segments 70. In one embodiment, wear material 80a may be positioned on nut strip 78, at a first axial side of sprocket 68, whereas other wear material 80b may be positioned on an opposite axial side of sprocket 68, comprising a portion of segment 70. It will be noted that the configuration of nut strip 78 and segment 70 is at least generally analogous to steps 32a and 32b of idler 20, each of elements 78 and 70 having a planar face 143a and 143b which comprises a portion of the corresponding contact interface 140a and 140b, respectively.

Figure 6:
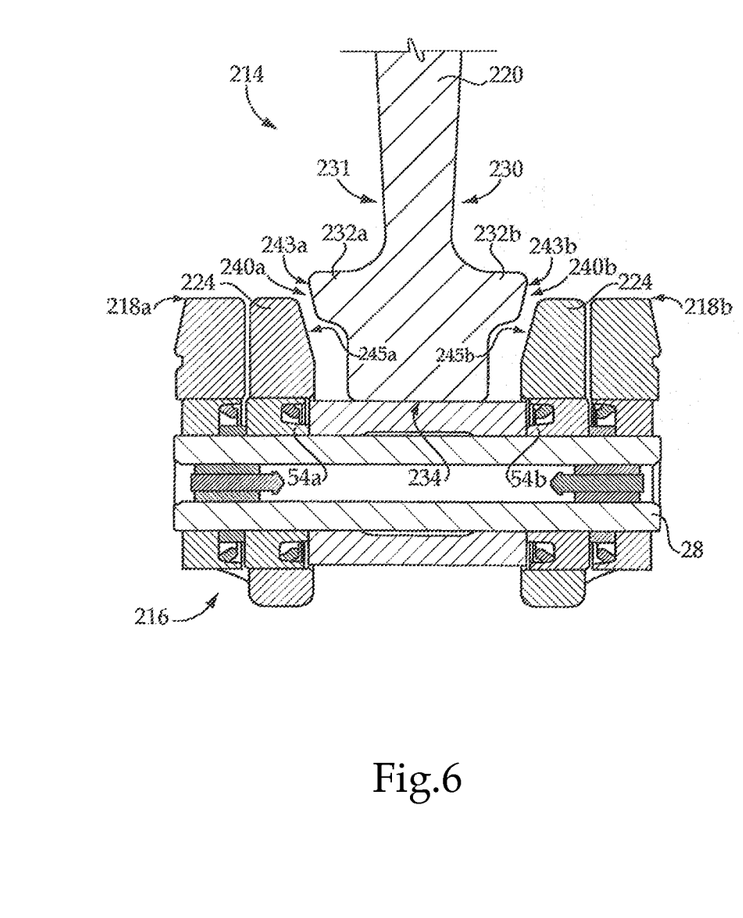
FIG. 6 is a partial sectioned view of a track assembly according to another embodiment.

Turning now to FIG. 6, there is shown a track assembly 214 according to yet another embodiment. Track assembly 214 includes a rotatable track engaging element 220, such as an idler, having a first axial side 231 and a second axial side 230. Rotatable track engaging element 220 is configured to contact a track 216 between a first track chain assembly 218a and a second track chain assembly 218b. Track assembly 214 further includes a first contact interface 240a between element 220 and chain assembly 218a, and a second contact interface 240b between element 220 and track chain assembly 218b. Contact interfaces 240a and 240b may include a first step 232a and a second step 232b, respectively, positioned to extend from first and second axial sides 231 and 230 and spaced radially inward of an outer diameter 234 of element 220, and each including sacrificial wear material thereon. The embodiment shown in FIG. 6 has certain similarities with previously described embodiments, in that contact interfaces 240a and 240b may comprise wear interfaces whereby damage to inner track seals 54a and 54b is inhibited via the proper placement of wear material, having an appropriate shape, which is based at least in part on a location of track seals 54a and 54b within their corresponding track links. In other words, like the embodiment of FIG. 3 the embodiment shown in FIG. 6 can include sacrificial wear material which wears away as track chain assemblies 218a and 218b are moved about element 220, avoiding wear in regions of the corresponding track links adjacent track seals 54a and 54b. In one embodiment, each of steps 232a and 232b may have a conical face 243a and 243b, respectively, which includes sacrificial wear material, whereas each of the inboard track links 224 may include an opposed face 245a and 245b, respectively, which is configured to contact faces 243a and 243b, respectively, during operation of track assembly 214.

Figure 7:
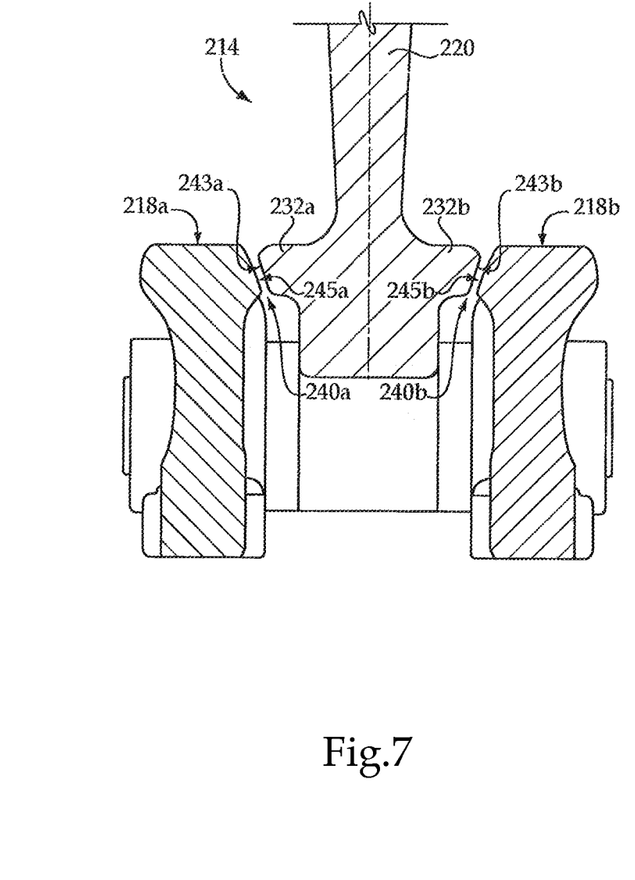
FIG. 7 is a partial sectioned view of the track assembly of FIG. 6 taken in a different section plane.

Track assembly 214 differs from track assembly 14 described above in that, rather than each contact interface including an interface of planar surfaces, faces 243a and 243b may be conical, and disposed at an angle relative to an axis of rotation of element 220, rather than being perpendicular thereto as in track assembly 14. Faces 245a and 245b may be conical, planar or some other configuration. Referring also to FIG. 7, there is shown a sectioned view of track assembly 214 taken in a different section plane, at a location spaced from pin 28 in contrast to FIG. 6 which is sectioned approximately through the middle of pin 28.

Figure 8:
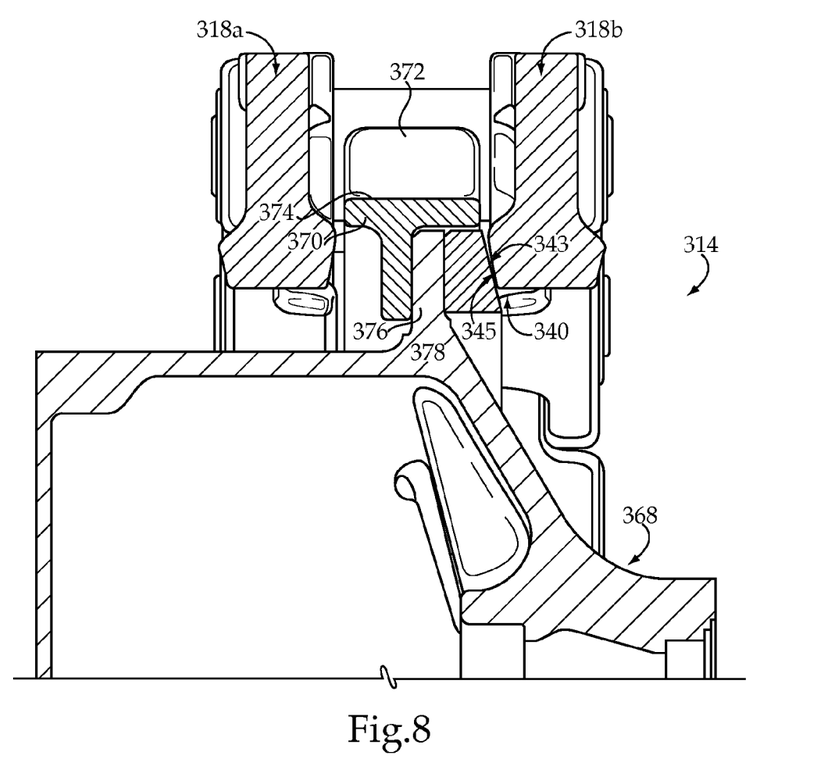
FIG. 8 is a partial sectioned view of a track assembly according to another embodiment.

Referring now to FIG. 8, there is shown another track assembly 314. It should be appreciated that track assembly 314 might be used with or comprise a part of one of the other track assemblies described herein, and is thus not necessarily a separate system. Track assembly 314 may include a rotatable track engaging element 368, such as a drive sprocket, having a flange 376 which is coupled with at least one track contacting segment 370 having alternating teeth 372 and pockets 374. Sprocket 368 operates generally in a manner similar to that described above with regard to the embodiment of FIG. 5, but has certain differences. Sprocket 368 is configured to engage with a track having a first track chain assembly 318a and a second track chain assembly 318b, and contacts the corresponding track between chain assemblies 318a and 318b, track contact segment 370 functioning in a manner similar to that of the embodiment of FIG. 5 to apply driving force to the associated track. A nut strip 378 may be bolted to flange 376, and in certain embodiments could include a plurality of separate nut strips. Nut strip 378 comprises a portion of a contact interface 340 between drive sprocket 368 and chain assemblies 318a and 318b. In contrast to the embodiment of FIG. 5, nut strip 378 may include a conical face 343 which is configured to contact another face 345 on links of chain assembly 318b. An additional contact interface having a configuration similar to that of interface 340, to protect seals within track chain assembly 318a, might be located on a side of sprocket 368 opposite that of interface 340 in certain embodiments.

Figure 9:
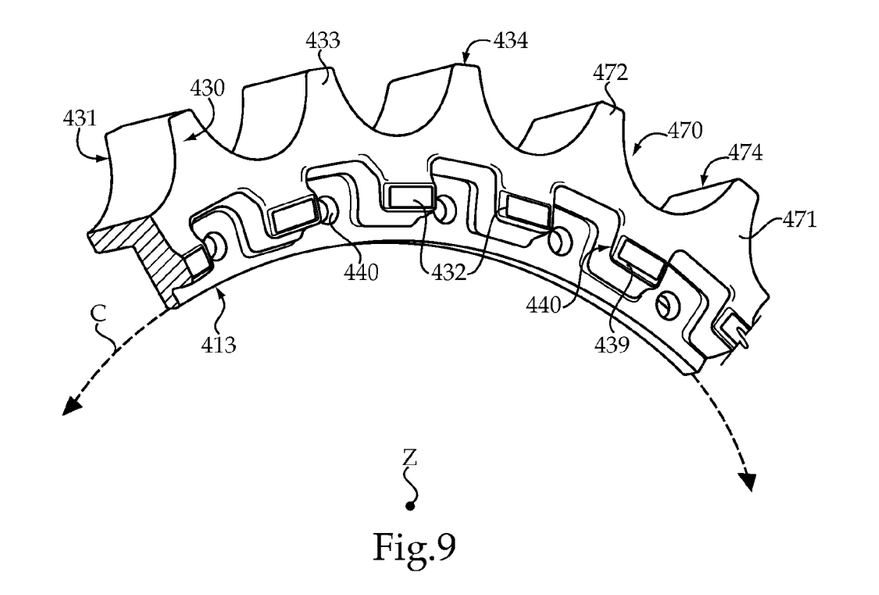
FIG. 9 is a diagrammatic view of a portion of a track assembly according to another embodiment.

Referring to FIG. 9, there is shown a diagrammatic view of a track contacting segment 470 suitable for use with a track engaging element such as a toothed idler or drive sprocket. Track contacting segment 470 may include an arcuate body 471 having a plurality of teeth 472 alternating with pockets 474, and is configured to engage with a track in a conventional manner. Arcuate body 471 further includes an outer diameter surface 434, an inner diameter surface 431 defining a segment of a circle C having a center axis Z, a first axial side 430, a second axial side 431, and a plurality of apertures 440 communicating between axial sides 430 and 431. An outboard axial surface 433 is shown located on axial side 430 in FIG. 9. Track contacting segment 470 further includes a contact interface 440 which comprises a discontinuous contact interface wherein faces of wear material 432 are spaced apart rather than consisting of a continuous step or the like. Identical wear material faces 432 may be located upon axially projecting steps 439, and spaced apart in an arcuate configuration as shown. The spacing between the faces of wear material 432 may be used to access bolts, etc. received in apertures 440 for coupling segment 470 with a hub component, etc. as will be readily apparent to those of skill in the art.

Figure 10:
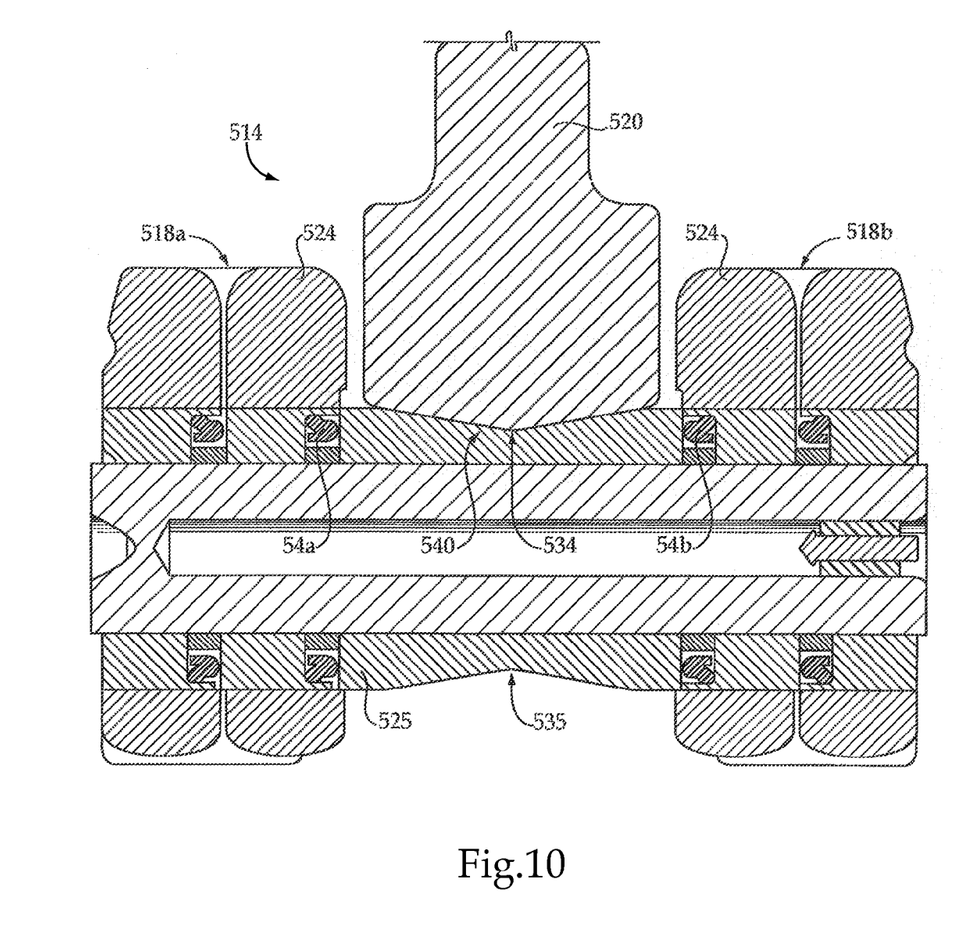
FIG. 10 is a partial sectioned view of a track assembly according to another embodiment.

Referring now to FIG. 10, there is shown a sectioned view of yet another track assembly 514. Track assembly 514 may include a rotatable track engaging element 520, such as an idler or possibly a drive sprocket, configured to engage with a track having a first chain assembly 518a and a second chain assembly 518b, each of which includes a plurality of inner track seals 54a and 54b. Track assembly 514 is an example of a track assembly according to the present disclosure wherein rather than a contact interface which comprises a wear interface to direct wear between the respective components, the contact interface 540 of track assembly 514 comprises a guide interface wherein contact between rotatable track engaging element 520 and track links of chain assemblies 518a and 518b is inhibited or avoided altogether, to protect inner track seals 54a and 54b. Any of the "guide" interface embodiments described herein might be used also with "wear" interfaces if desired. In one embodiment, contact interface 540 may include a first guide element 534 on rotatable track engaging element 520, and a second guide element 535 complementary to guide element 534 which is located on a roller bushing 525. In the embodiment shown, track engaging element 520 includes a crown 534 which fits within a complementary groove 535 formed in roller bushing 525. Accordingly, during operation of track assembly 514 rotatable track engaging element 520 and track chain assemblies 518a and 518b are maintained in a state at which contact between axial sides or corners of track engaging element 520 and inboard track links 524 is limited or avoided, as interaction between crown 534 and element 535 tends to keep element 520 from moving laterally toward either of chain assemblies 518a and 518b. In a related embodiment, the configuration of the components of contact interface 540 might be reversed. In other words, roller bushing 525 could include a crown, and track engaging element 520 could include a groove.

Figure 11:
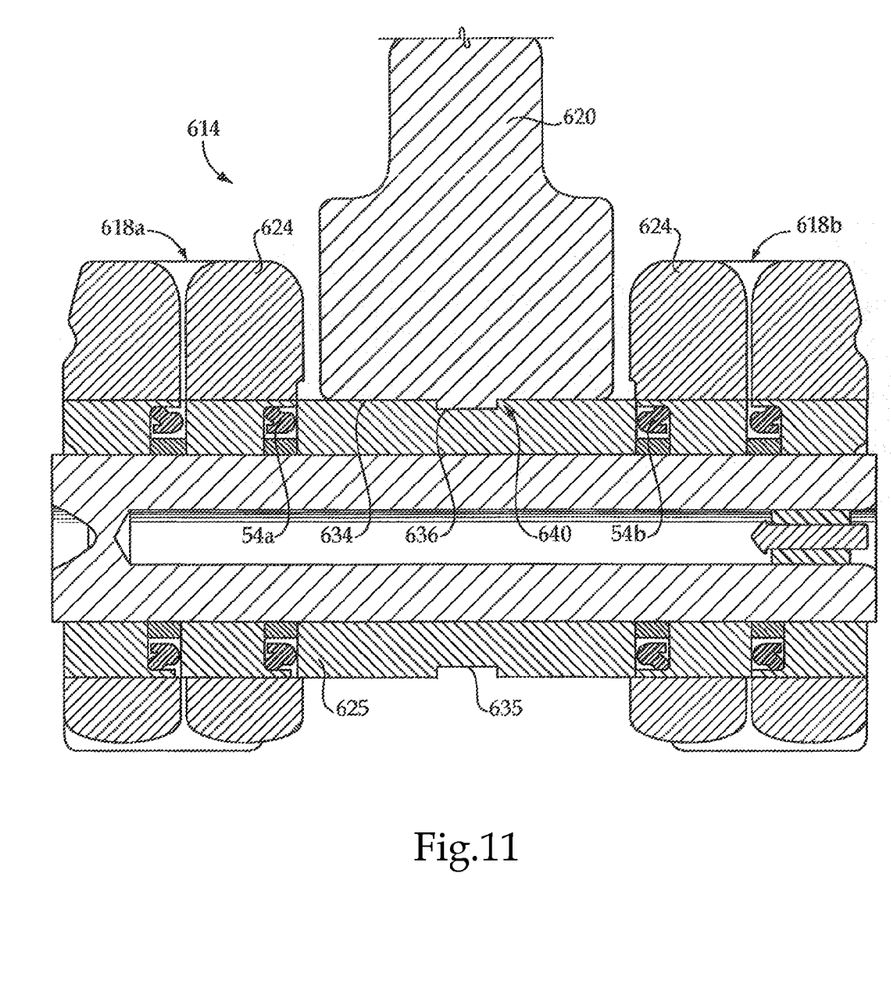
FIG. 11 is a partial sectioned view of a track assembly according to another embodiment.

Turning to FIG. 11, there is shown yet another track assembly 614 according to the present disclosure. Similar to the embodiment shown in FIG. 10, track assembly 614 includes a contact interface 640 wherein, rather than directing wear between components, wear is avoided by inhibiting or eliminating contact between certain of the components. In particular, a rotatable track engaging element 620 is provided which includes a tab or ridge 636 formed on an outer diameter 634 thereof. Tab 636 will typically be circumferential of outer diameter 634 and may fit within a slot 635 formed in a roller bushing 625, such that side to side movement of element 620 relative to a first track chain 618a and a second track chain 618b is limited, reducing or eliminating a tendency for rotatable track engaging element 620 to contact inner track links 624 in regions adjacent inner track seals 54a and 54b. Contact interface 640 might also be reversed, such that slot 635 is in element 620 and tab 636 is formed on roller bushing 625.

Figure 12:
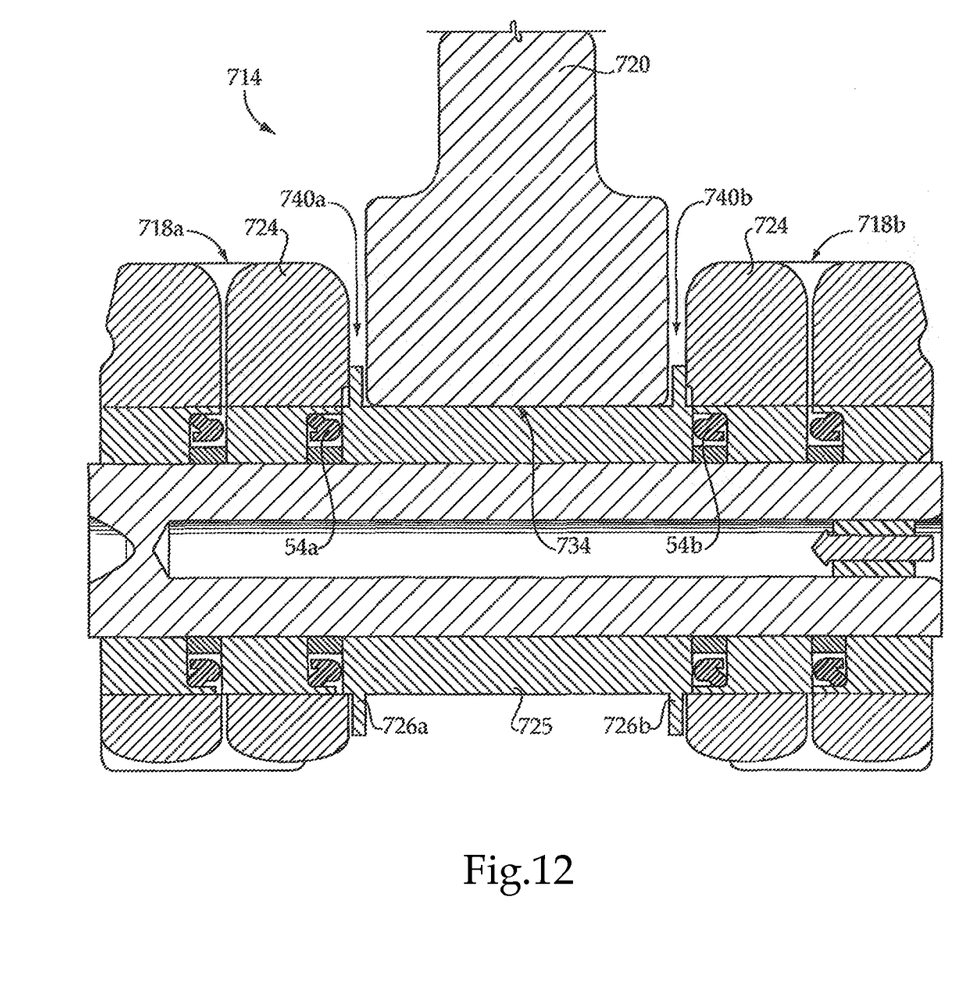
FIG. 12 is a partial sectioned view of a track assembly according to another embodiment.

Turning now to FIG. 12, there is shown still another track assembly 714 according to the present disclosure. Track assembly 714 also includes a rotatable track engaging element 720 having an outer diameter 734. Outer diameter 734 contacts a roller bushing 725 positioned between a first chain assembly 718a and a second chain assembly 718b. Track assembly 714 further includes contact interfaces 740a and 740b. In the embodiment shown in FIG. 12, each of contact interfaces 740a and 740b includes a flange 726a and 726b located at each end of roller bushing 725. During operation, flanges 726a and 726b may inhibit or eliminate contact between track engaging elements 720 and inboard track links 724 in regions where track seals 54a and 54b are located, as flanges 726a and 726b are positioned inboard of track seals 54a and 54b and between links 724 and element 720. Flanges 726a and 726b could also comprise sacrificial wear material, such as hardened material, which wears away via contact with element 720.

Industrial Applicability

Referring to FIGS. 1-5, the portions of contact interfaces 40a and 40b located on idler 20, e.g. steps 32a and 32b and the corresponding wear material 42a and 42b, are generally uniform about idler 20, having a generally circular configuration and extending inwardly from outer diameter 34, curving into and out of the page in the FIG. 3 illustration. The portions of wear interfaces 140a and 140b located on sprocket 68 may have an analogous configuration. The following description of idler 20 in conjunction with track 16 may thus be understood to refer to sprocket 68, except where otherwise noted. The portions of contact interfaces 40a and 40b located on links 24a and 24b and the corresponding wear material 44a and 44b generally have a linear configuration, extending perpendicular to and in and out of the page in FIG. 3. As a result, the interface between wear material 42a and 42b on idler 20 and wear material 44a and 44b is different at different locations along the contact length L, given the interface of a curving component, idler 20, with straight links 24a and 24b.

Figure 4:
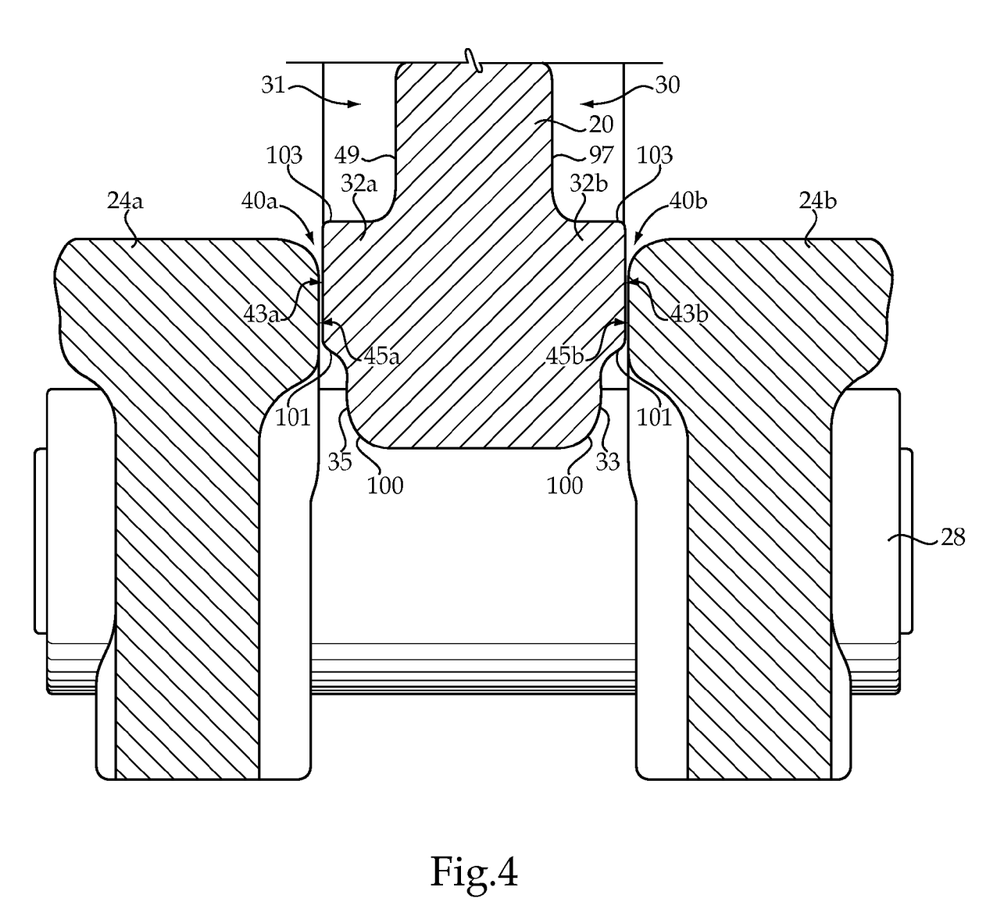
FIG. 4 is a sectioned view taken along line 4-4 of FIG. 1.

FIG. 3 illustrates the relative location of the respective planar faces of each wear interface 40a and 40b at one location along contact length L, i.e. at pin 28. Referring to FIG. 4, there is shown a partially sectioned view taken along line 4-4 of FIG. 1. FIG. 4 illustrates the differing relative locations of faces 45a and 43a, and 45b and 43b at a location spaced from pin 28 along contact length L. This configuration differs from that of certain earlier designs wherein at certain points along a contact length between track links and an idler, corners of the idler impinged upon surfaces of the track links in regions adjacent the track seals. As a consequence, the sharp idler corners had a certain tendency to wear away link material more quickly than desired, at least in certain instances. The present disclosure overcomes such wear issues by providing a different type of contact interface altogether, with hardened material placed in different locations and having a different shape than that of earlier strategies. It may also be noted from FIGS. 3 and 4 that surface 97 and a counterpart surface 49 on axial side 31 each include a lower axial elevation and a lower material hardness, surface 33 and a counterpart surface 35 on axial side 31 each include a middle axial elevation and a higher material hardness, and surfaces 43a and 43b each include a higher axial elevation and a higher material hardness. Idler 20 also includes a lesser axial thickness between surfaces 97 and 49, a medium axial thickness between surfaces 33 and 35, and a greater axial thickness between surfaces 43a and 43b.

It should be appreciated that idler 20 will typically have an axial thickness between planar faces 43a and 43b which is slightly less than a distance between planar faces 45a and 45b. As a result, idler 20 may alternately contact links 24a and 24b during moving track 16 into engagement with, rotating about, and disengaging from idler 20, the alternating contact serving to guide track 16 laterally with respect to idler 20. In other words, track 16 may move back and forth relative to idler 20, resulting in alternate contact therebetween at contact interfaces 40a and 40b. Relative movement of links 24a and 24b as the subject portion of track 16 moves into engagement with idler 20 can also result in sliding contact at contact interfaces 40a and 40b as outer diameter 34 moves toward or away from bushing 25 during engagement or disengagement, respectively, of a given portion of track 16 with idler 20. Each of these types of contact between the respective faces of wear interfaces 40a and 40b can, and is intended to, wear away wear material 42a and 42b and 44a and 44b. Outer diameter 34 will also wear due to its engagement with bushing 25, often increasing the total contact area at interfaces 40a and 40b as steps 32a and 32b migrate relatively closer to outer diameter 34 due to loss of material from outer diameter 34. In the case of sprocket 68, wear will take place in an analogous manner, simultaneously wearing material 44a and 44b from links 24a and 24b, and wearing material 80a and 80b from sprocket 68.

Returning to FIG. 5, it may further be noted that bushing 25 extends into recess 60. An end of bushing 25 within recess 60 of inboard track link 24a lies in a plane A. Plane A also extends approximately along/through an inboard edge of seal 54a. Plane A is spaced from another plane O positioned inboard of plane A. The terms "inboard" and "outboard" as used herein in describing planes A and O will be understood to have meanings familiar to those skilled in the art of machine track, i.e. inboard means toward a center of track 16 between its track chain assemblies, in other words toward a longitudinal midpoint of pin 28, whereas outboard means away from the center of track 16 and toward lateral sides of track 16, in other words toward terminal ends of pin 28. Plane O lies approximately at an outboard end of recess 60, and is in turn spaced inboard from yet another plane B which is defined by planar face 45a. Planar face 143a of nut strip 78 also defines a plane, plane C, which is spaced slightly inboard of plane B but will typically move relative thereto with side to side motion of sprocket 68 between track chain assemblies 18a and 18b. FIG. 5 illustrates certain of the design attributes of the present disclosure via the illustration of planes A, B, C and O whereby seals 54a and 54b, of each of the inboard links 24a and 24b of track 16 can be protected from wear during track operation. It should be appreciated that idler 20 has analogous features and wear characteristics with regard to protecting seals 54a and 54b, as its interaction with track 16 will be similar to the interaction of sprocket 68 therewith. In other words, the present description of planes A, B, C and O may be understood to refer to corresponding features of idler 20.

The separation of plane A from plane O, and the separation of plane O from plane B positions seal 54a sufficiently away from wear interface 140a that any tendency for sprocket 68 to wear away link material in a region of link 24a adjacent seal 54a is much reduced or eliminated as compared with earlier designs. In other words, for link 24a to begin to wear adjacent seal 54a, hardened wear material 44a would need to be worn away such that planes B and O are no longer separated. Then, additional material would need to be worn away such that planes O and A are no longer separated. The relative distances separating the respective planes may be chosen such that seal service life is not a limiting factor in track service life. The shape of the components defining the wear interfaces described herein further reduces the wear rates as compared with earlier designs, as planar wear interfaces 40a, 40b, 140a, and 140b may wear more slowly than interfaces wherein angled, or otherwise non-planar interfaces between components are used. Moreover, hardened material abuts and wears against hardened material at the wear interfaces, in contrast to earlier strategies wherein unhardened material was subjected to wear.

In view of the foregoing, it will be appreciated that the unique configuration, location and composition of contact interfaces 40a, 40b, 140a and 140b ensures that wearing of idler 20, sprocket 68 and track links 24a and 24b occurs in a manner that protects seals 54a and 54b. In other words, by selecting an appropriate shape for the relevant parts of idler 20, sprocket 68 and links 24a and 24b, wear of links 24a and 24b will predominantly take place in regions not adjacent to seals 54a and 54b. Rather, links 24a and 24b will have a tendency to wear at planar faces 45a and 45b. This strategy contrasts with earlier designs, discussed above, wherein contact interfaces between the respective components had neither a shape nor other attributes that specifically accounted for the location of the inboard track seals, and consequently wear of inboard track links from contact with other track components had a tendency to take place in regions close to the inboard track seals, ultimately risking or causing seal damage and leakage.

The embodiments of FIGS. 6 and 7 will have a tendency to operate in a manner similar to that described with regard to the embodiments of FIGS. 1-5. In some instances, the embodiment of FIGS. 6 and 7 will be well suited to use with existing track configurations, except for relatively minor differences. In other words, the configuration of rotatable track engaging element 220 is such that it may be used with track chain assemblies having components sized and shaped similar to that of existing designs, without the need for reconfiguring link shape, length, etc. The embodiment shown in FIG. 8 has similar applicability to certain existing track designs. With regard to the FIG. 9 embodiment, it too will operate similarly to that of the embodiments of FIGS. 1-5, however, rather than wear occurring along a continuous contact interface, other intermittently spaced elements of contact interface 440 will wear during track assembly operation.

As discussed above, each of the embodiments of FIGS. 10 and 11 may rely at least in part upon guiding between the rotatable track engaging element 520, 620, and the associated track chain assemblies 518a and 518b, and 618a and 618b, respectively. In other words, rather than directing wear to particular regions of the track links, contact between the respective components is limited in the first place. The embodiment of FIG. 12 can function to protect track seals 54a and 54b in a manner that relies upon both guiding between the components and sacrificial wear material. In one embodiment, flanges 726a and 726b may include sacrificial wear material, and rotatable track engaging element 720 may also include sacrificial wear material in corresponding locations. During operation of track assembly 714, wear between flanges 726a and 726b and element 720 can prevent wear of inboard track links 724 in regions adjacent seals 54a and 54b. In addition, flanges 726a and 726b may assist in guiding element 720 to reduce or eliminate the tendency for element 720 to contact links 724.

The present disclosure thus provides a number of different ways of addressing certain wear issues in track assemblies. It should be appreciated that many of the features of the various embodiments could be combined in a single track assembly. Moreover, many of the specific features disclosed herein might be omitted from a track assembly design without departing from the scope of the present disclosure. It should further be appreciated that the specific geometry of the various contact interface designs might be changed substantially. For example, rather than steps 32a and 32b having the illustrated configuration, they might have a rounded shape. Further still, the shapes of, and interaction between, components may vary over time as material is worn away, while still providing protection for seals 54a and 54b.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. An inboard track link for coupling with an outboard track link via a cartridge pin to form a chain assembly in a ground engaging track, the inboard track link comprising:
    an elongate link body including an outboard and an inboard side, a link end, and having a bore formed therein which extends between the outboard and inboard sides and has a longitudinal bore axis;
    the bore being defined by unhardened material of the link body, and configured to receive therein an inner track seal positioned within an inboard collar of the cartridge pin; and
    the link body further having a seal region adjacent to the bore, and an inboard face for protecting the inner track seal, the inboard face including a hardened sacrificial wear material and being positioned radially outward of the seal region and axially inboard of the bore, to contact a projecting step on a rotatable track engaging element guiding or driving the ground engaging track such that impingement of the rotatable track engaging element upon the seal region is inhibited.

2. The inboard track link of claim 1 wherein the link body further includes a seal protecting recess formed therein and adjoining the bore.

3. The inboard track link of claim 2 wherein the bore has an axial bore length, and the seal protecting recess has an axial recess length less than the axial bore length.

4. The inboard track link of claim 3 wherein the bore includes a first bore located adjacent the link end, and the link body further includes a second bore formed therein and configured to receive a second cartridge pin.

5. The inboard track link of claim 4 wherein the link body further includes an upper link surface forming a rail for contacting a track roller in the ground engaging track, and the inboard face adjoins the upper link surface.

6. The inboard track link of claim 5 wherein the upper link surface is formed in part of the hardened sacrificial wear material.

7. The inboard track link of claim 1 wherein the bore includes a first bore located adjacent the link end, and the link body further includes a second bore formed therein and configured to receive a second cartridge pin.

8. The inboard track link of claim 7 wherein the second bore has a second longitudinal bore axis, and the first and second longitudinal axes define a plane, and wherein the link body further includes an upper link surface positioned on a first side of the plane, and a lower link surface positioned on a second side of the plane, and the inboard face being located between the plane and the upper link surface.

9. The inboard track link of claim 8 wherein the hardened sacrificial wear material extends between the inboard face and the upper link surface along the link body.

10. A track chain assembly for a ground engaging track comprising:
   an outboard track link having a first bore formed therein;
   an inboard track link having a second bore formed therein, the second bore having a longitudinal bore axis and extending between an outboard side and an inboard side of the inboard track link; and
   a cartridge pin coupling the outboard track link to the inboard track link, and including an outboard collar and an outer track seal positioned within the first bore, and an inboard collar and an inner track seal positioned within the second bore;
   the inboard track link further having a seal region adjacent to the second bore, and an inboard face for protecting the inner track seal, positioned radially outward of the seal region and axially inboard of the second bore, the second bore being defined by unhardened material of the link body, and the inboard face including a hardened sacrificial wear material, and being configured to contact a projecting step on a rotatable track engaging element guiding or driving the ground engaging track, such that impingement of the rotatable track engaging element upon the seal region is inhibited.

11. The track chain assembly of claim 10 wherein each of the inboard and outboard track links includes an upper link surface, and further comprising a rail formed by the upper link surfaces, for contacting a track roller of the ground engaging track.

12. The track chain assembly of claim 11 wherein each of the outboard track link and the inboard track link includes a one-piece straight link body.

13. The track chain assembly of claim 12 further comprising a bushing rotatably positioned upon the cartridge pin.

14. The track chain assembly of claim 13 wherein the inboard track link further includes a seal protecting recess formed therein, the seal protecting recess having an axial recess length and the inner track seal being axially spaced from the inboard side a distance equal to the axial recess length.

15. A ground engaging track comprising:
   a first chain assembly including a plurality of outboard track links and a plurality of inboard track links;
   a second chain assembly including another plurality of outboard track links and another plurality of inboard track links; and
   a plurality of cartridge pins coupling together the first and second chain assemblies, each of the cartridge pins including a first and a second outboard collar each having an outer track seal positioned therein, and a first and a second inboard collar each having an inner track seal positioned therein;
   each of the inboard track links of the first and second chain assemblies having a bore formed therein extending between an outboard side and an inboard side of the corresponding inboard track link, and receiving an inboard collar and an inner track seal of one of the cartridge pins; and
   each of the inboard track links further having a seal region adjacent to the corresponding bore, and an inboard face for protecting the corresponding inner track seal, each of the bores being defined by unhardened material of the link body, and each of the inboard faces including a hardened sacrificial wear material and being positioned radially outward of the bore.

16. The ground engaging track of claim 15 further comprising a plurality of bushings rotatably positioned one upon each of the cartridge pins.

17. The ground engaging track of claim 16 wherein each of the inboard track links has a seal protecting recess formed therein.

18. The ground engaging track of claim 17 wherein each of the bushings extends into the seal protecting recesses in an opposed pair of the inboard track links.

19. The ground engaging track of claim 15 wherein the first chain assembly includes a first rail, and the second chain assembly includes a second rail, and the inboard faces being located between the bore in the corresponding inboard track link and the corresponding first or second rail.

* * * * *